US006941267B2

(12) United States Patent
Matsumoto

(10) Patent No.: US 6,941,267 B2
(45) Date of Patent: Sep. 6, 2005

(54) SPEECH DATA COMPRESSION/EXPANSION APPARATUS AND METHOD

(75) Inventor: Chikako Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 805 days.

(21) Appl. No.: 09/907,656

(22) Filed: Jul. 19, 2001

(65) Prior Publication Data

US 2002/0123897 A1 Sep. 5, 2002

(30) Foreign Application Priority Data

Mar. 2, 2001 (JP) ....................................... 2001-057980

(51) Int. Cl.[7] ............................ G10L 13/02; H04B 1/66

(52) U.S. Cl. ....................................... 704/258; 704/501

(58) Field of Search ................................ 704/258, 265, 704/266, 267, 268, 269, 270, 500, 501, 503, 504; 341/64, 65, 107; 379/88.1

(56) References Cited

U.S. PATENT DOCUMENTS 5,384,893 A * 1/1995 Hutchins .................... 704/267
5,675,333 A * 10/1997 Boursier et al. .............. 341/87
5,845,238 A * 12/1998 Fredenburg .................... 704/1
5,978,757 A * 11/1999 Newton ...................... 704/217
6,185,525 B1 * 2/2001 Taubenheim et al. ....... 704/211
6,252,945 B1 * 6/2001 Hermann et al. .......... 379/88.1
6,502,064 B1 * 12/2002 Miyahira et al. .............. 704/7
6,510,412 B1 * 1/2003 Sasai et al. ................. 704/257
6,535,583 B1 * 3/2003 Bobick et al. ............. 379/88.1
6,661,845 B1 * 12/2003 Herath .................. 375/240.23
6,665,641 B1 * 12/2003 Coorman et al. ........... 704/260
6,748,355 B1 * 6/2004 Miner et al. ................ 704/203
6,760,703 B2 * 7/2004 Kagoshima et al. ........ 704/262
6,813,601 B1 * 11/2004 Hedinger .................... 704/221

FOREIGN PATENT DOCUMENTS

JP 4-19799 1/1992

* cited by examiner

*Primary Examiner*—Martin Lerner
(74) *Attorney, Agent, or Firm*—Staas & Halsey LLP

(57) ABSTRACT

Waveform data is extracted by referring to an existing waveform dictionary. Regarding the waveform data, a use frequency used for speech synthesis is accumulated and stored. A compression method is gradually changed in accordance with the use frequency, whereby the waveform data is compressed and stored in the waveform dictionary. Furthermore, information on a compression method for each compressed waveform data is stored, and the compressed waveform data is expanded based on information regarding the compression method. Regarding the use frequency of the waveform data, one or a plurality of predetermined threshold values are determined, and in a plurality of use frequency ranges partitioned with threshold values, the waveform data belonging to a use frequency range with a lower use frequency is compressed at a correspondingly increased compression ratio.

19 Claims, 8 Drawing Sheets

| Compression information | Bit information |
|---|---|
| No compression | 000 |
| LHA | 001 |
| $\mu$-LAW | 010 |
| ADPCM | 011 |
| CS-ACELP | 100 |
| ⋮ | ⋮ |

SPEECH DATA COMPRESSION/EXPANSION APPARATUS AND METHOD

BACKGROUND OF THE INVENTION

1. Field of the Invention

The present invention relates to a compression apparatus for compressing waveform dictionary data composed of speech waveform data used for speech synthesis to create a compressed dictionary, and an expansion apparatus for expanding compressed data of the compressed dictionary.

2. Description of the Related Art

Due to the recent rapid development of computer technology, speech synthesis technology, of which use has conventionally been limited to the particular field, is becoming applicable to various fields. Along with this, various applications using speech synthesis are being actively developed.

In order to facilitate the use of an application using speech synthesis, it is required to realize high quality speech synthesis. This requires that a large amount of sound waveform data that is a relatively large capacity of data should be prepared. Thus, efficient compression/expansion of a large capacity of waveform data is important from a technical point of view.

For example, in order to compress sound waveform data, various procedures, such as $\mu$-law, ADPCM, and CELP (in an increasing order of a compression ratio) have been considered. In general, as a compression ratio is increased, sound quality tends to degrade.

FIG. 1 shows a diagram illustrating the principle of a compression/expansion apparatus that has been conventionally used. In FIG. 1, reference numeral 11 denotes a waveform data input part, 12 denotes a waveform data compression/storage part, 13 denotes a waveform dictionary, 14 denotes a text data input part, 15 denotes a waveform dictionary reference/extraction part, 16 denotes a waveform data expansion part, and 17 denotes a synthesized speech output part.

In FIG. 1, only waveform data is a target for compression/expansion. Thus, waveform data is input from the waveform data input part 11, and the input waveform data is compressed in the waveform data compression/storage part 12, and stored in the waveform dictionary 13 as compressed waveform data.

Text data is input from the text data input part 14. The waveform dictionary 13 is referred to in the waveform dictionary reference/extraction part 15, and compressed waveform data matched with the text data is extracted. The extracted waveform data is expanded in the waveform data expansion part 16 during synthesis and reproduction of speech, and reproduced in the synthesized speech output part 17.

However, according to the above-mentioned compression/expansion method, higher quality waveform data with a higher compression ratio consumes a larger amount of computer resources during expansion, which takes a considerable amount of time only for expansion. This makes it impossible to conduct speech synthesis in real time.

Furthermore, some compression apparatuses cannot compress speech on a phoneme basis, and can generate compressed waveform data only on a syllable and sentence basis. Therefore, in the case where waveform data required for speech synthesis is the one smaller than a compression unit of waveform data, it is also required to expand an unwanted portion for speech synthesis. This takes a time longer than necessary for expansion.

SUMMARY OF THE INVENTION

Therefore, with the foregoing in mind, it is an object of the present invention to provide a speech data compression/expansion apparatus and method capable of realizing speech synthesis in real time by changing a compression method of waveform data to shorten an expansion time.

In order to achieve the above-mentioned object, a speech data compression/expansion apparatus of the present invention includes: a waveform data reference/extraction part for extracting waveform data by referring to an existing waveform dictionary; a use frequency information storage part for accumulating a use frequency used for speech synthesis regarding the extracted waveform data and storing it; a use frequency-based compressed data generation/storage part for compressing the waveform data by changing a compression method gradually in accordance with the use frequency, storing the compressed waveform data in the waveform dictionary, and storing information on the compression method regarding each of the compressed waveform data; and a waveform data expansion part for expanding the compressed waveform data stored in the waveform dictionary, based on the information on the compression method, wherein one or a plurality of predetermined threshold value is determined with respect to the use frequency regarding the waveform data, and in a plurality of use frequency ranges partitioned with the threshold values, waveform data belonging to the use frequency range with a smaller use frequency is compressed by a compression method with a correspondingly increased compression ratio.

Because of the above-mentioned configuration, as the use frequency of waveform data becomes higher, the compression ratio thereof is decreased. Therefore, waveform data with a higher use frequency can be expanded in a shorter period of time, and this allows speech synthesis to be substantially conducted in real time.

Furthermore, in the speech data compression/expansion apparatus of the present invention, it is preferable that regarding the waveform data belonging to the use frequency range with a large use frequency, the waveform data expanded in the waveform data expansion part is stored in a temporary memory region, and speech synthesis is conducted using the expanded waveform data. Because of this configuration, regarding waveform data that is often used, expanded waveform data can be directly used for speech synthesis, and an expansion time itself can be eliminated, so that speech synthesis can be conducted in a shorter period of time.

Furthermore, in the speech data compression/expansion apparatus of the present invention, it is preferable that in a case where it becomes impossible to additionally store the newly expanded waveform data in the temporary memory region, the waveform data is deleted from the temporary memory region successively in an order from the waveform data with a smallest use frequency. Since there is a physical restriction to the temporary memory region, waveform data with a high use frequency remains.

Furthermore, in a speech data compression/expansion apparatus of the present invention, it is preferable that in a case where the waveform data expanded in the waveform data expansion part is stored in a temporary memory region irrespective of the use frequency, and it becomes impossible to additionally store the newly expanded waveform data in the temporary memory region, the waveform data is deleted from the temporary memory region successively in an order from the waveform data with a smallest use frequency. Because of this configuration, at the beginning of use, speech synthesis can be conducted with respect to any waveform data in a short period of time, and only waveform data with a high use frequency is stored as the apparatus is used more.

Furthermore, in the speech data compression/expansion apparatus of the present invention, it is preferable that the use frequency is accumulated based on a purpose of use. Because of this configuration, even if a use frequency is varied depending upon a purpose of use, speech synthesis can be conducted in accordance with a situation.

Next, in order to achieve the above-mentioned object, a speech data compression apparatus of the present invention includes: a waveform data reference/extraction part for extracting waveform data by referring to an existing waveform dictionary; a use frequency information storage part for accumulating a use frequency used for speech synthesis regarding the extracted waveform data and storing it; and a use frequency-based compressed data generation/storage part for compressing the waveform data by changing a compression method gradually in accordance with the use frequency, storing the compressed waveform data in the waveform dictionary, and storing information on the compression method regarding each of the compressed waveform data, wherein a plurality of predetermined threshold values are determined with respect to the use frequency regarding the waveform data, and in a plurality of use frequency ranges partitioned with the threshold values, waveform data belonging to the use frequency range with a smaller use frequency is compressed by a compression method with a correspondingly increased compression ratio.

Because of the above-mentioned configuration, as the use frequency of waveform data becomes higher, the compression ratio thereof is decreased. Therefore, waveform data with a higher use frequency can be expanded in a shorter period of time, and this allows speech synthesis to be substantially conducted in real time.

Next, in order to achieve the above-mentioned object, the speech data expansion apparatus of the present invention is characterized in that regarding the waveform data compressed by using the above-mentioned speech data compression/expansion apparatus, the compressed waveform data stored in the waveform dictionary is expanded based on the information on the compression method.

Because of the above-mentioned configuration, as the use frequency of waveform data becomes higher, the expansion time thereof can be shortened, and this allows speech synthesis to be substantially conducted in real time.

Furthermore, in the speech data expansion apparatus of the present invention, it is preferable that regarding the waveform data belonging to the use frequency range with a large use frequency, the waveform data expanded in the waveform data expansion part is stored in a temporary memory region, and speech synthesis is conducted by using the expanded waveform data. Because of this configuration, regarding waveform data that is often used, expanded waveform data can be directly used for speech synthesis, and an expansion time itself can be eliminated, so that speech synthesis can be conducted in a shorter period of time.

Furthermore, in the speech data expansion apparatus of the present invention, it is preferable that in a case where it becomes impossible to additionally store the newly expanded waveform data in the temporary memory region, the waveform data is deleted from the temporary memory region successively in an order from the waveform data with a smallest use frequency. Since there is a physical restriction to the temporary memory region, waveform data with a high use frequency is left.

Furthermore, in the speech data expansion apparatus of the present invention, it is preferable that in a case where the waveform data expanded in the waveform data expansion part is stored in a temporary memory region irrespective of the use frequency, and it becomes impossible to additionally store the newly expanded waveform data in the temporary memory region, the waveform data is deleted from the temporary memory region successively in an order from the waveform data with a smallest use frequency. Because of this configuration, at the beginning of use, speech synthesis can be conducted with respect to any waveform data in a short period of time, and only waveform data with a high use frequency is stored as the apparatus is used more.

Furthermore, the present invention is characterized by software for executing the functions of the above-mentioned speech data compression/expansion apparatus as processes of a computer. More specifically, the present invention is characterized by a speech data compression/expansion method including: extracting waveform data by referring to an existing waveform dictionary; accumulating a use frequency used for speech synthesis regarding extracted waveform data and storing it; compressing the waveform data by changing a compression method gradually in accordance with the use frequency, storing the compressed waveform data in the waveform dictionary, and storing information on the compression method regarding each of the compressed waveform data; and expanding the compressed waveform data stored in the waveform dictionary, based on the information on the compression method, wherein one or a plurality of predetermined threshold value is determined with respect to the use frequency regarding the waveform data, and in a plurality of use frequency ranges partitioned with the threshold values, waveform data belonging to the use frequency range with a smaller use frequency is compressed by a compression method with a correspondingly increased compression ratio, and a computer-readable recording medium storing a program for embodying such processes.

Because of the above-mentioned configuration, by loading the program onto a computer for execution, as the use frequency of waveform data becomes higher, the compression ratio thereof is decreased. Therefore, a speech data compression/expansion apparatus can be realized in which waveform data with a higher use frequency can be expanded in a shorter period of time, and this allows speech synthesis to be substantially conducted in real time.

Furthermore, the present invention is characterized by software for executing the functions of the above-mentioned speech data expansion apparatus as processes of a computer. More specifically, the present invention is characterized by a speech data expansion method for, regarding the waveform data compressed by using the above-mentioned speech data compression/expansion method, expanding the compressed waveform data stored in the waveform dictionary based on the information on the compression method, and a computer-readable recording medium storing a program for embodying such processes.

Because of the above-mentioned configuration, by loading the program onto a computer for execution, as the use frequency of waveform data becomes higher, the compression ratio thereof is decreased. Therefore, a speech data expansion apparatus can be realized in which waveform data with a higher use frequency can be expanded in a shorter period of time, and this allows speech synthesis to be substantially conducted in real time.

Furthermore, the present invention is characterized by software for executing the functions of the above-mentioned speech data compression apparatus as processes of a computer. More specifically, the present invention is characterized by a speech data compression method including: extracting waveform data by referring to an existing waveform dictionary; accumulating a use frequency used for speech synthesis regarding the extracted waveform data and storing it; and compressing the waveform data by changing a compression method gradually in accordance with the use frequency, storing the compressed waveform data in the waveform dictionary, and storing information on the compression method regarding each of the compressed waveform data, wherein a plurality of predetermined threshold values are determined with respect to the use frequency regarding the waveform data, and in a plurality of use frequency ranges partitioned with the threshold values, waveform data belonging to the use frequency range with a smaller use frequency is compressed by a compression method with a correspondingly increased compression ratio, and a computer-readable recording medium storing a program for embodying such processes.

Because of the above-mentioned configuration, by loading the program onto a computer for execution, as the use frequency of waveform data becomes higher, the compression ratio thereof is decreased. Therefore, a speech data compression apparatus can be realized in which waveform data with a higher use frequency can be expanded in a shorter period of time, and this allows speech synthesis to be substantially conducted in real time.

These and other advantages of the present invention will become apparent to those skilled in the art upon reading and understanding the following detailed description with reference to the accompanying figures.

DESCRIPTION OF THE PREFERRED EMBODIMENTS

Figure 1:
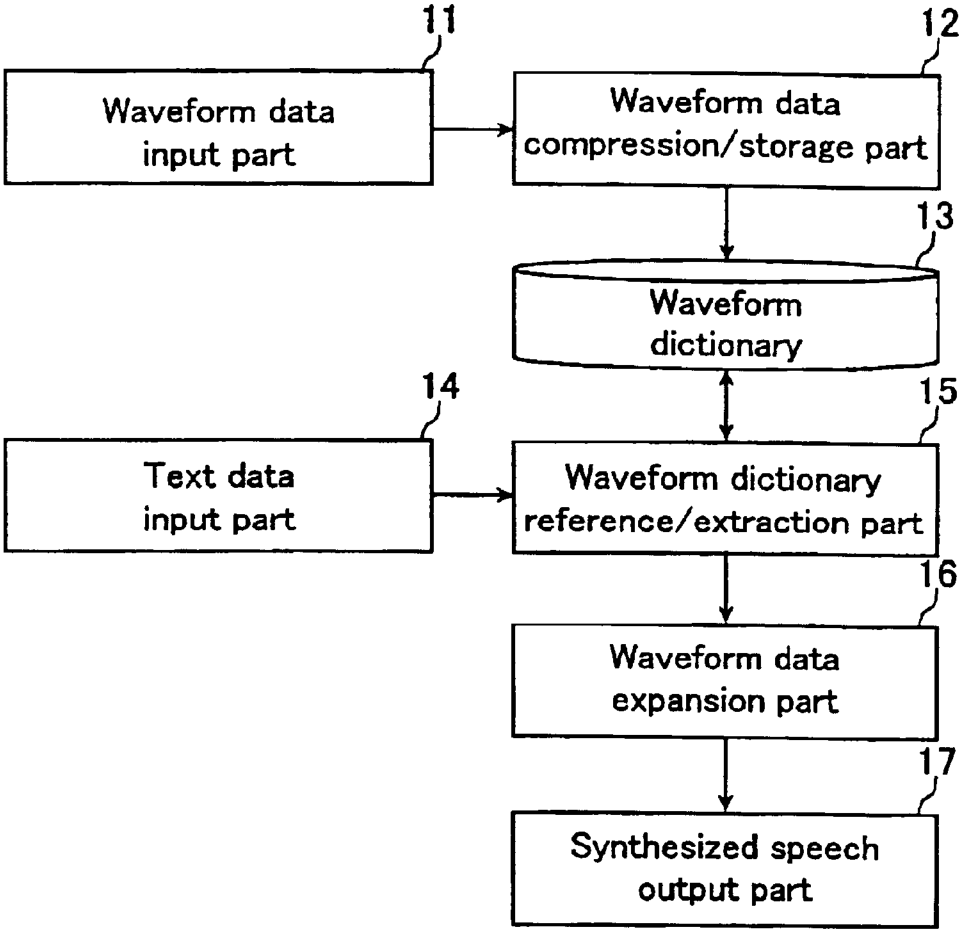
FIG. 1 PRIOR ART
FIG. 1 is a block diagram of a conventional speech data compression/expansion apparatus.
Figure 2:
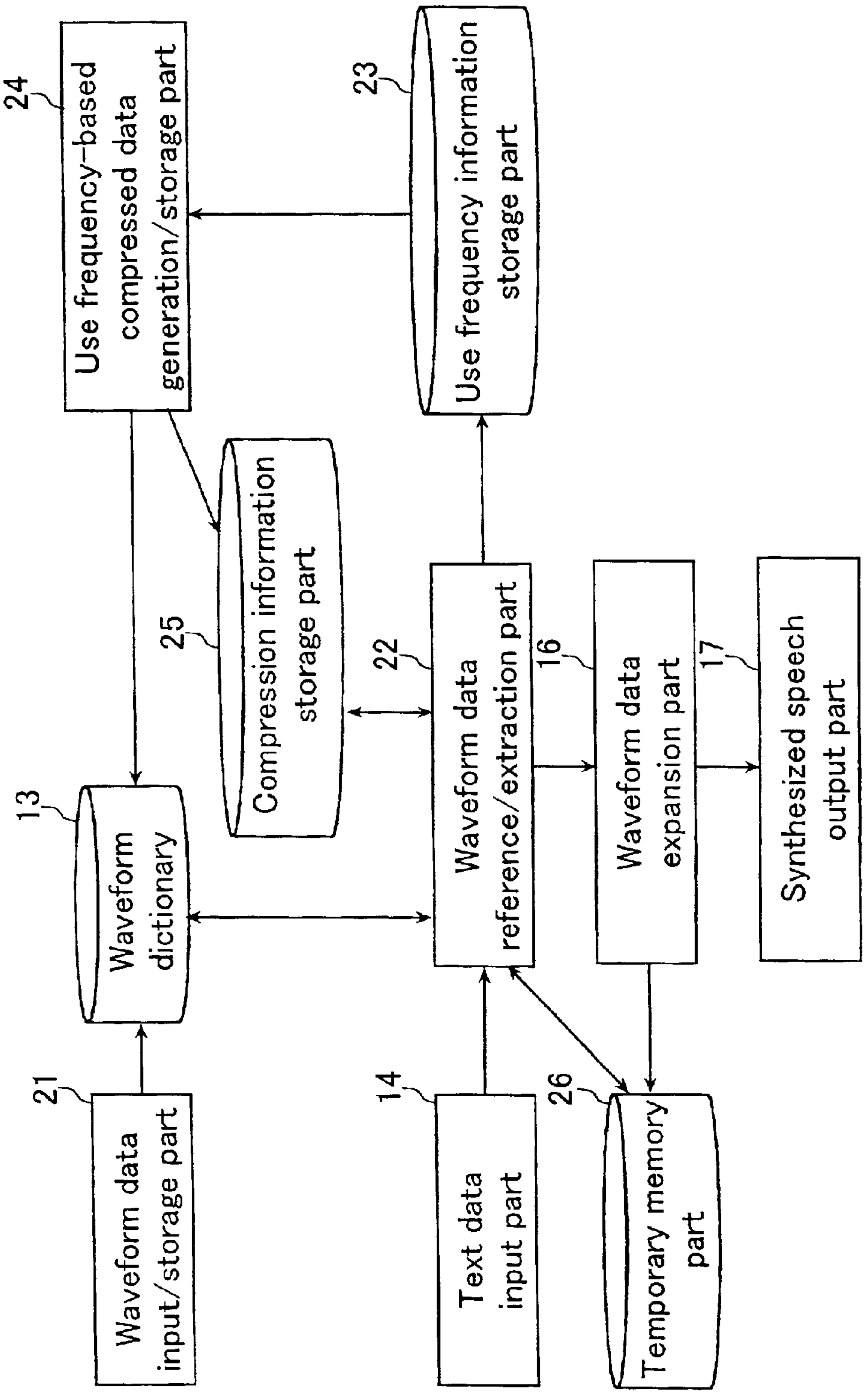
FIG. 2 is a block diagram of a speech data compression/expansion apparatus of an embodiment according to the present invention.

Hereinafter, a speech data compression/expansion apparatus of an embodiment according to the present invention will be described with reference to the drawings. FIG. 2 is a block diagram illustrating the principle of a speech data compression/expansion apparatus of an embodiment according to the present invention. In FIG. 2, reference numeral 21 denotes a waveform data input/storage part, 22 denotes a waveform data reference/extraction part, 23 denotes a use frequency information storage part, 24 denotes a use frequency-based compressed data generation/storage part, 25 denotes a compression information storage part, and 26 denotes a temporary memory part. The components denoted with the same reference numerals as those in FIG. 1 are intended to have the same functions as those in a conventional speech data compression/expansion apparatus, and the detailed description thereof will be omitted.

First, in FIG. 2, waveform data is input to the waveform dictionary 13 via the waveform data input/storage part 21. Herein, unlike the conventional case, it is not necessarily required that the waveform data is compressed.

When text data is input from the text data input part 14, the waveform dictionary 13 is referred to in the waveform data reference/extraction part 22, and the corresponding waveform data is extracted on a phoneme basis. In the present embodiment, although the case will be described in which waveform data is extracted on a phoneme basis, the extraction unit is not particularly limited thereto. For example, waveform data may be extracted on a corpus basis, a syllable basis, or a breath group basis.

The use frequency information storage part 23 always monitors which phoneme of the waveform dictionary 13 the waveform data extracted in the waveform data reference/extraction part 22 uses, and indexes the degree of a use frequency for each phoneme label. In the present embodiment, the number of uses is accumulated for each phoneme label. The accumulation results of the number of uses are stored as a use frequency for each phoneme label.

Next, in the use frequency-based compressed data generation/storage part 24, waveform data compressed by a plurality of methods is generated by gradually changing the compression method in accordance with the use frequency for each phoneme label stored in the use frequency information storage part 23. More specifically, regarding a phoneme with a very high use frequency, the frequency at which waveform data is compressed and expanded is also high, and in particular, when real-time reproduction is required, an expansion time cannot be ignored. In this case, compression is not conducted so as to eliminate an expansion time. Furthermore, compression is conducted using a compression method with a low compression ratio so that an expansion time can be further shortened in a decreasing order of a use frequency.

In the present embodiment, although compression information and use frequency information are stored in a memory part separate from the waveform dictionary, the storage form is not particularly limited thereto, and compression information and the like may be stored together in the waveform dictionary.

Thus, by gradually changing the compression method in accordance with the use frequency, speech synthesis is conducted as follows: regarding a phoneme with a high use frequency, speech can be synthesized in a relatively short period of time, and regarding a phoneme with a low use frequency, computer resources such as a disk capacity can be saved by conducting compression at a high compression ratio.

The compressed waveform data itself is stored in the waveform dictionary 13 in the same way as in the other waveform data, and the information on a compression method (i.e., information regarding which compression method is used for each phoneme) and the like are stored in the compression information storage part 25 together with link information with respect to the compressed waveform data.

In the waveform data reference/extraction part 22, not only the waveform dictionary 13 but also the compression information storage part 25 are referred to, and the compression information for expanding the waveform data extracted from the waveform dictionary 13 is obtained.

Next, the extracted waveform data or the compressed waveform data is sent to the waveform data expansion part 16. In the case where the extracted waveform data is compressed, the compressed waveform data is expanded by an appropriate method based on the compression information obtained from the compression information storage part 25. On the other hand, in the case where the extracted waveform data is not compressed, it is not required to conduct any expansion processing.

Then, the use frequency information storage part 23 is referred to, and regarding the waveform data with a high use frequency, it is stored in the temporary memory part 26 after expansion.

The reason for this is as follows: in the waveform data reference/extraction part 22, when text data is input from the text data input part 14, the temporary memory part 26 is referred to before the waveform dictionary 13 and the compression information storage part 25 are referred to, whereby the expansion processing for waveform data with a high use frequency is omitted. It can be determined whether or not the use frequency is high, based on whether or not it is higher than a predetermined threshold value.

More specifically, in the case where the waveform data corresponding to the input text data is stored in the temporary memory part 26, it is not necessarily required to extract and expand the compressed data, and speech synthesis is conducted by using the waveform data after expansion stored in the temporary memory part 26. Because of this, synthesized speech can be output in a short period of time without an excessive expansion time, and real-time reproduction can also be conducted.

Finally, synthesized speech is generated based on the expanded waveform data or the extracted waveform data, and the generated synthesized speech is output from the synthesized speech output part 17. As the synthesized speech output part 17, a speech output apparatus such as a speaker is generally considered. However, there is no particular limit to the kind of the apparatus and the like.

Figure 3:
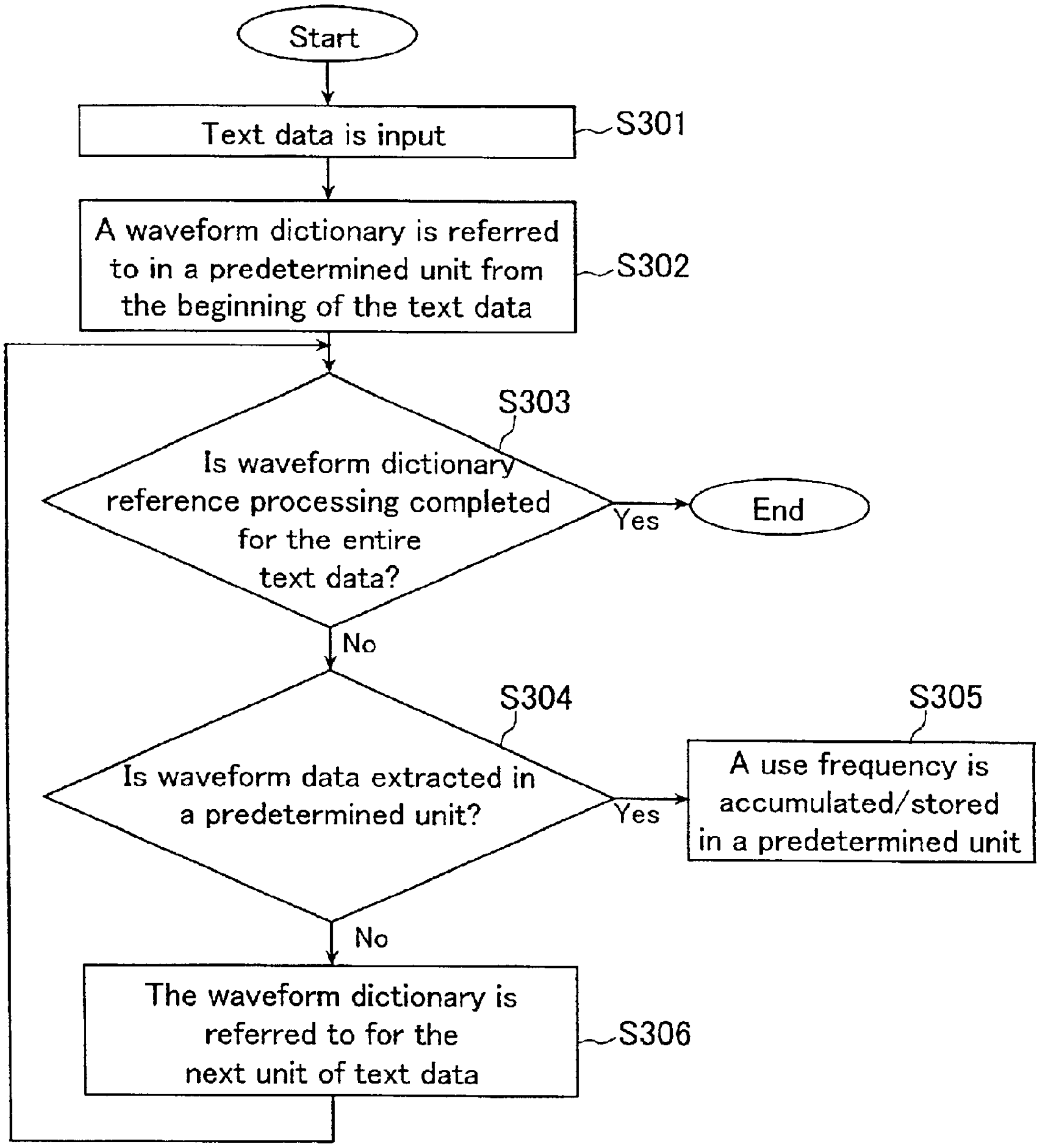
FIG. 3 is a flow diagram of use frequency information creation processing in the speech data compression/expansion apparatus of an embodiment according to the present invention.

The above-mentioned processing will be described in terms of a flow of processing. First, FIG. 3 is a flow diagram showing processing during creation of use frequency information. Herein, the case will be described in which two high and low threshold values are set as standards so as to determine the level of a use frequency, and three compression forms are selectively used in accordance with the standards.

First, referring to FIG. 3, text data is input (Operation 301). From the beginning of the input text data, a waveform dictionary is referred to (Operation 302).

If waveform data matched with the input text data is present in the waveform dictionary, the waveform data is extracted (Operation 304: Yes), and a use frequency of the waveform data is accumulated and stored (Operation 305). If waveform data matched with the input text data is not present in the waveform dictionary (Operation 304: No), processing is not particularly required, and the waveform dictionary is similarly referred to for the next unit of text data (Operation 306).

Finally, when waveform dictionary reference processing is completed with respect to the entire text data (Operation 303: Yes), the entire processing is completed, and the use frequency is left.

Figure 4:
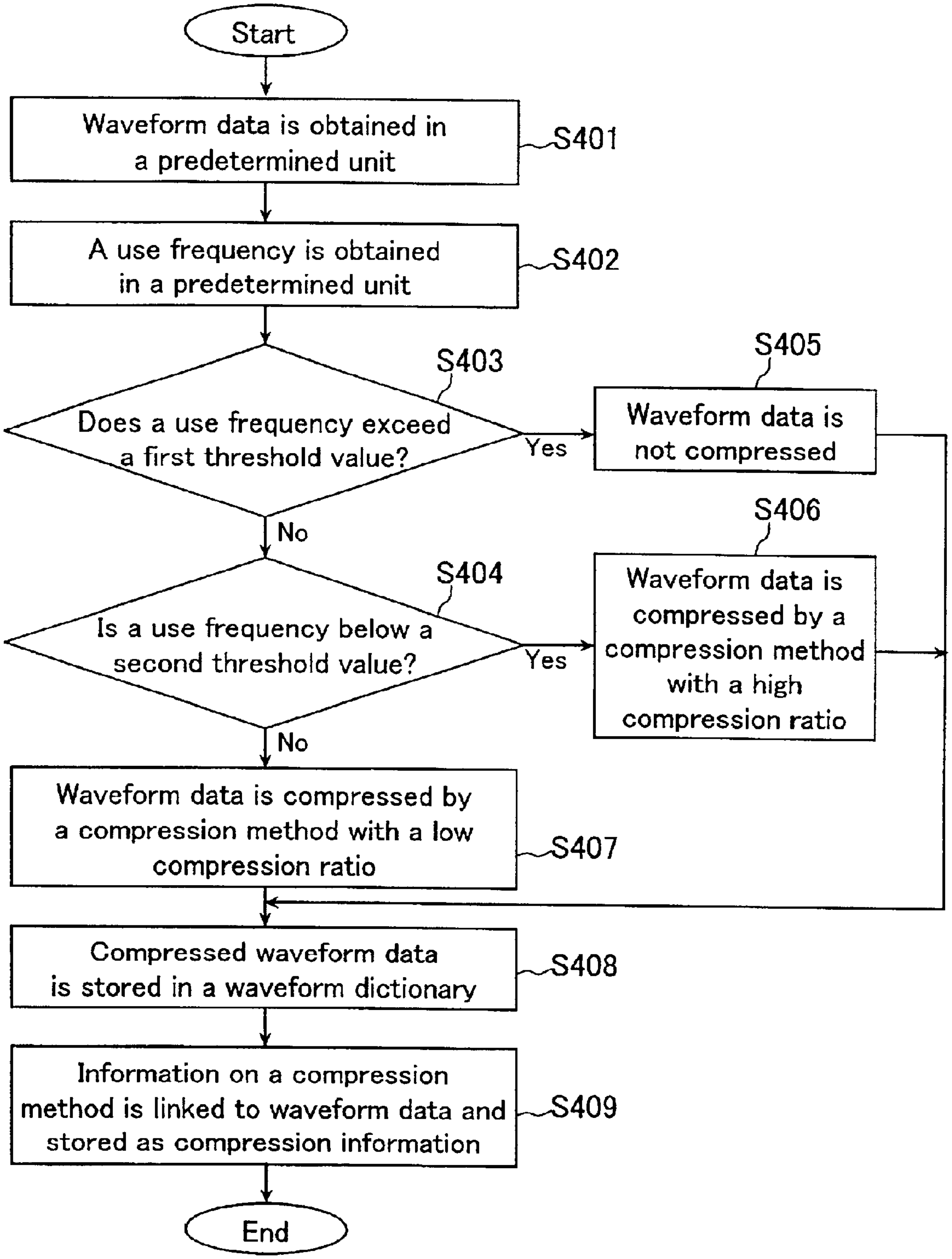
FIG. 4 is a flow diagram of compressed data generation processing in the speech data compression/expansion apparatus of an embodiment according to the present invention.

Next, FIG. 4 is a flow diagram illustrating processing during creation of compressed data. First, waveform data to be compressed is obtained (Operation 401). Then, a stored use frequency is obtained (Operation 402).

Next, in accordance with the use frequency, the compression method is gradually changed (Operations 403 to 407). More specifically, in the case where the use frequency exceeds a predetermined first threshold value (Operation 403: Yes), the use frequency is determined to be high, and compression itself is not conducted (Operation 405).

Furthermore, when the use frequency is below a predetermined second threshold value (Operation 404: Yes), the use frequency is determined to be low, and compression is conducted by a compression method with a relatively high compression ratio (Operation 406).

Furthermore, in the case where the use frequency is in a range of the first threshold value to the second threshold value, the use frequency is determined to be an intermediate level, and compression is conducted by a compression method with a relatively low compression ratio (Operation 407).

Then, the compressed waveform data is stored in the waveform dictionary (Operation 408), and information on a compression method (i.e., information regarding which compression method is used) and the like is stored as compression information together with link information with respect to the compressed waveform data (Operation 409).

Figure 5:
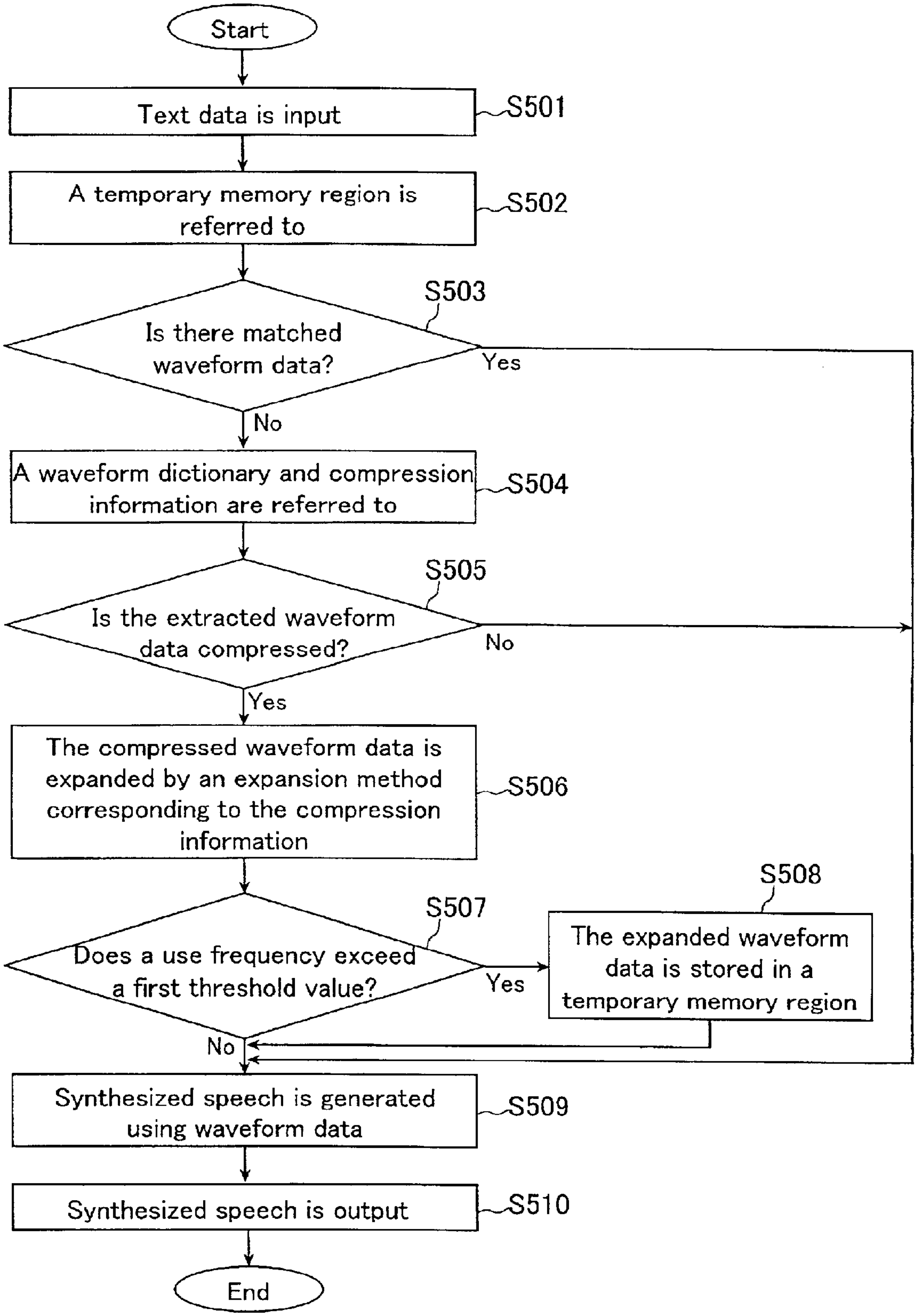
FIG. 5 is a flow diagram of speech synthesis processing in the speech data compression/expansion apparatus of an embodiment according to the present invention.

FIG. 5 is a flow diagram illustrating processing during speech synthesis. When text data is input (Operation 501), first regarding the input text data, a temporary memory region is referred to for each phoneme, (Operation 502). In the case where there is waveform data matched with the input text data in the temporary memory region (Operation 503: Yes), speech is synthesized by using the waveform data stored in the temporary memory region (Operation 509).

When there is no waveform data matched with the input text data in the temporary memory region (Operation 503: No), regarding the remaining text data that is not matched with any waveform data in the temporary memory region, the waveform dictionary and the compression information are referred to (Operation 504). Then, it is determined whether or not the extracted waveform data is compressed (Operation 505). In the case where the extracted waveform data is not compressed (Operation 505: No), it is not required to expand the extracted waveform data, so that speech is synthesized by using the waveform data as it is without expansion (Operation 509).

In the case where the extracted waveform data is compressed (Operation 505: Yes), the extracted waveform data is expanded by an expansion method corresponding to the compression method based on the compression information (Operation 506).

Then, in the case where the use frequency exceeds a predetermined first threshold value (Operation 507: Yes), the waveform data after expansion is stored in the temporary memory region (Operation 508).

Finally, synthesized speech is generated based on the expanded waveform data or the waveform data itself (Operation 509), and the generated synthesized speech is output (Operation 510). This will be specifically described below.

Figure 6:
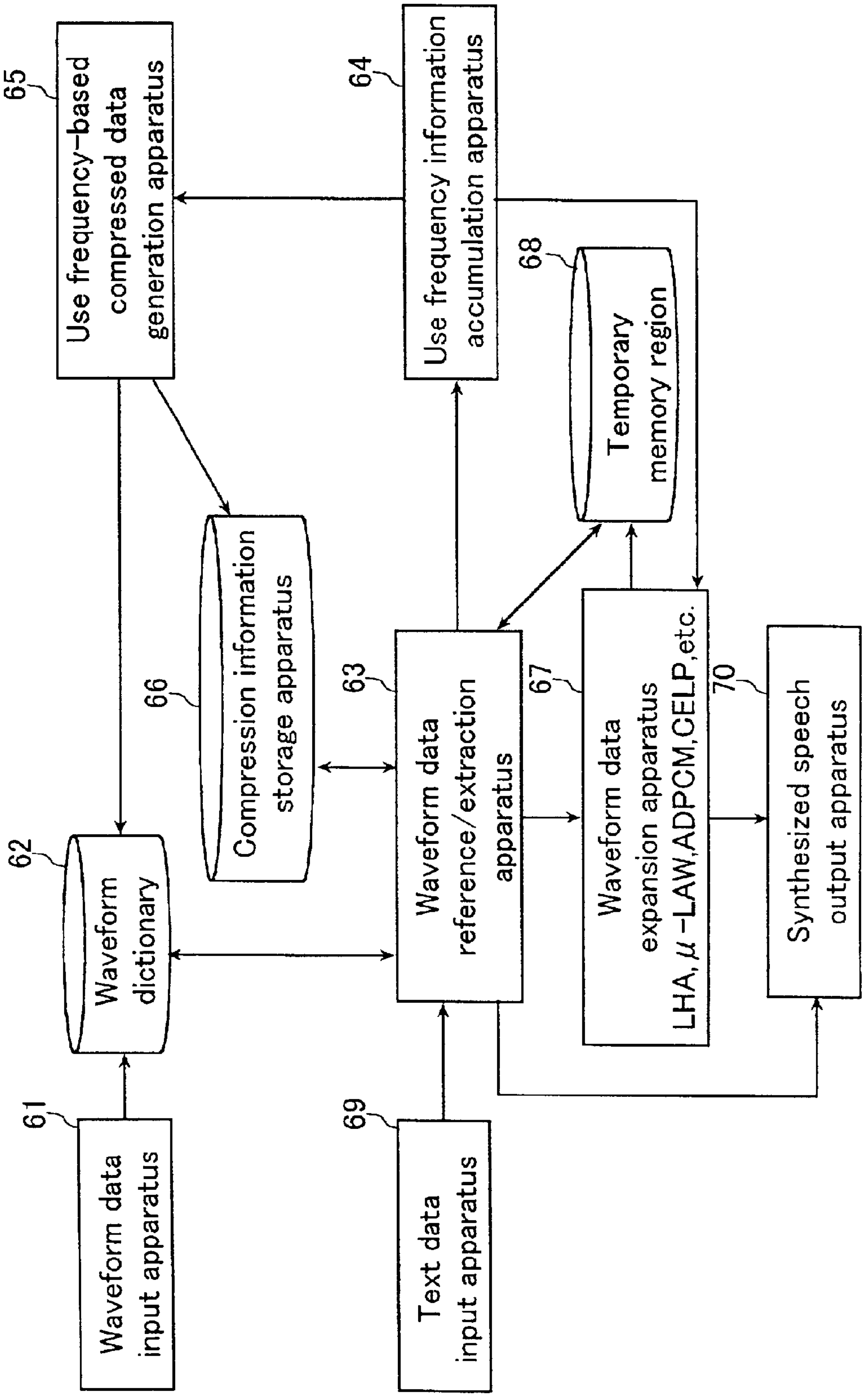
FIG. 6 is a block diagram of a speech synthesis system of an example according to the present invention.

FIG. 6 is a block diagram showing the case where the speech data compression/expansion apparatus of the present invention is applied to a corpus-based speech synthesis system. In FIG. 6, waveform data is input to a waveform dictionary 62 via a waveform data input apparatus 61. Herein, data to be input may be compressed waveform data or uncompressed waveform data.

When text data is input from a text data input apparatus 69, a waveform dictionary 62 is referred to in a waveform data reference/extraction apparatus 63, and the corresponding waveform data is extracted on a phoneme basis.

A use frequency information accumulation apparatus 64 always monitors which phoneme of the waveform dictionary 62 the extracted waveform data uses, and a use frequency for each phoneme label is accumulated. Such accumulation results are stored in a use frequency information accumulation apparatus 64 for each phoneme label. The use frequency may be stored in the use frequency information accumulation apparatus 64 during creation of a dictionary, or may be updated every time during speech synthesis and the like. This is because a compression ratio of the waveform data can be determined based on a use frequency in accordance with more practical use conditions.

Furthermore, regarding the accumulation results of a use frequency, the use frequency may be accumulated based on a purpose of use of waveform data. Because of this, waveform data with a high use frequency can be expanded exactly in a short period of time for a particular purpose of use, so that real-time speech synthesis can be conducted more efficiently.

Next, in the use frequency-based compressed data generation apparatus 65, a compression method is gradually changed in accordance with a use frequency for each phoneme label stored in the use frequency information accumulation apparatus 64, whereby compression waveform data is generated using a plurality of methods. More specifically, regarding a phoneme that is determined to have a very high use frequency, the frequency at which waveform data is compressed and expanded is also high. In particular, in the case where real-time reproduction is required, an expansion time cannot be ignored. In this case, compression is not conducted so as to eliminate an expansion time. Furthermore, compression is conducted by using a compression method with a low compression ratio so that an expansion time can be shortened in a decreasing order of a use frequency.

By gradually changing a compression method in accordance with the use frequency, speech synthesis is conducted as follows: regarding a phoneme with a high use frequency, speech can be synthesized in a relatively short period of time, and regarding a phoneme with a low use frequency, computer resources such as a disk capacity can be saved by conducting compression at a high compression ratio.

More specifically, regarding a phoneme with the highest use frequency, compression is conducted by a lossless compression method such as LHA. Regarding a phoneme with the second highest use frequency, compression is conducted by $\mu$-LAW. Regarding a phoneme with the third highest use frequency, compression is conducted by ADPCM. Regarding a phoneme with the lowest use frequency, compression is conducted by CELP with a higher compression ratio. The level of a use frequency is generally determined in accordance with a threshold value based on a use frequency. The determination method is not particularly limited thereto.

The compressed waveform data itself is stored in the waveform dictionary 62 in the same way as in the other waveform data. The information on a compression method (i.e., information regarding which compression method is used for each phoneme) and the like are stored in the compression information storage apparatus 66 together with link information with respect to the compressed waveform data.

In the waveform data reference/extraction apparatus 63, the compression information storage apparatus 66 as well as the waveform dictionary 62 are simultaneously referred to, whereby compression information for expanding the waveform data extracted from the waveform dictionary 62 is obtained.

Figures 7, 8:
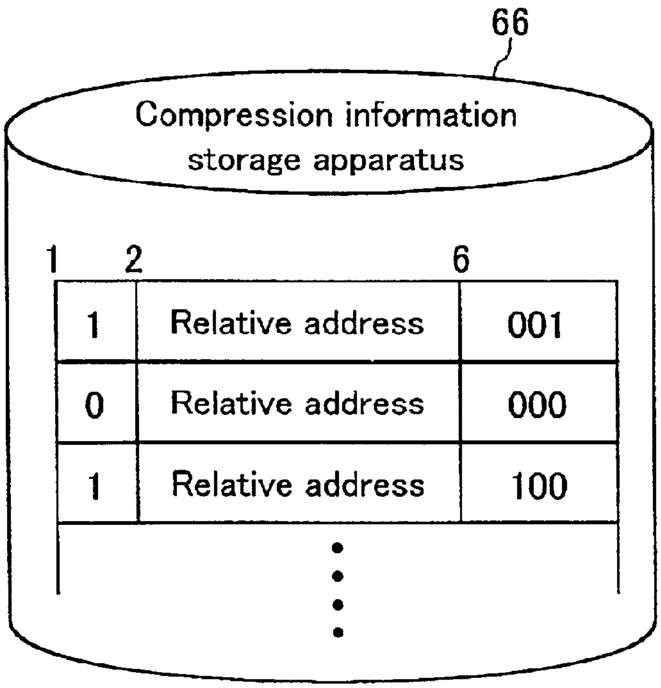
FIG. 7 illustrates a data configuration of compression information in the speech synthesis system of an example according to the present invention.
FIG. 8 illustrates a data configuration of compression information in the speech synthesis system of an example according to the present invention.

As a recording data configuration of compression information in the compression information storage apparatus 66, for example, the configuration as shown in FIG. 7 is considered. FIG. 7 shows the case where 8 bits of information region is assigned to one phoneme. In the case where the compression information has a flag showing whether or not it is stored in the temporary memory region 68, reference to the compression information is conducted during the processing at Operations 501 to 509. When the flag is "1", the temporary memory region 68 is accessed.

In FIG. 7, the 1st bit represents a flag indicating whether or not the waveform data corresponding to the phoneme is stored in the temporary memory region 68. For example, flag "1" indicates that the waveform data is stored in the temporary memory region 68, and flag "0" indicates that the waveform data is not stored in the temporary memory region 68.

Then, the 2nd bit to the 5th bit represents a relative address in the case where the waveform data corresponding to the phoneme is stored in the temporary memory region 68. Actually, a conversion table with an actual address is separately provided, and conversion processing is conducted based on the relative address, whereby an actual address is obtained. Herein, the description thereof will be omitted.

Finally, the 6th bit to the 8th bit represent bit information indicating a compression method. For example, as shown in FIG. 8, a compression method can be specified based on each bit information. For example, "000" represents uncompressed waveform data itself, "001" represents lossless compression such as LHA, and the like. Thus, bit information and a compression method are specified in one-to-one correspondence.

As the information region, it is not necessarily required to assign 8 bits to each phoneme. There is no particular limit to a data configuration as long as it can specify whether or not information is stored in the temporary memory region 68, a storage address in the case where the waveform information is stored, a compression method, and the like.

Next, the extracted waveform data or the compressed waveform data is sent to a waveform data expansion apparatus 67. In the case where the extracted waveform data is compressed, the waveform data is expanded by an appropriate method based on the compression information obtained from the compression information storage apparatus 66. On the other hand, in the case where the extracted waveform data is not compressed, expansion processing is not required.

Then, the use frequency information accumulation apparatus 64 is referred to, and regarding the waveform data determined to have a high use frequency, it is stored in the temporary memory region 68 after expansion.

In the waveform data reference/extraction apparatus 63, in the case where text data is input from the text data input apparatus 69, the temporary memory region 68 is referred to before the waveform dictionary 62 and the compression information storage apparatus 66 are referred to, whereby expanded waveform data (not compressed waveform data) can be directly used, regarding waveform data with a high use frequency.

More specifically, in the case where waveform data corresponding to input text data is stored in the temporary memory region 68, speech synthesis is conducted by using waveform data after expansion stored in the temporary memory region 68 without extracting and expanding compressed data. Because of this, synthesized speech can be output in a short period of time without an excessive expansion time, and real-time reproduction can also be conducted.

Finally, synthesized speech is generated based on the expanded waveform data or the extracted waveform data, and the generated synthesized speech is output from the synthesized speech output apparatus 70. As the synthesized speech output apparatus 70, a speech output apparatus such as a speaker is generally considered. However, there is no particular limit to the kind of the apparatus and the like.

As described above, according to the present embodiment, in the case where waveform data is registered in a waveform dictionary, the waveform data is compressed based on a use frequency in an arbitrary unit. Consequently, waveform data with a high use frequency can be compressed by a compression method with a low compression ratio (i.e., a short expansion time), and waveform data with a low use frequency can be compressed by a compression method with a high compression ratio (i.e., a long expansion time and a small data capacity). Therefore, a speech synthesis apparatus can be provided in which the balance between the shortening of an expansion time in a scene requiring real-time reproduction and the effective use of computer resources can be achieved at a high level.

Furthermore, by providing a temporary memory region, it is not required to expand waveform data with a high use frequency. Therefore, an expansion time can be further shortened, and real-time reproduction can be achieved.

Figure 9:
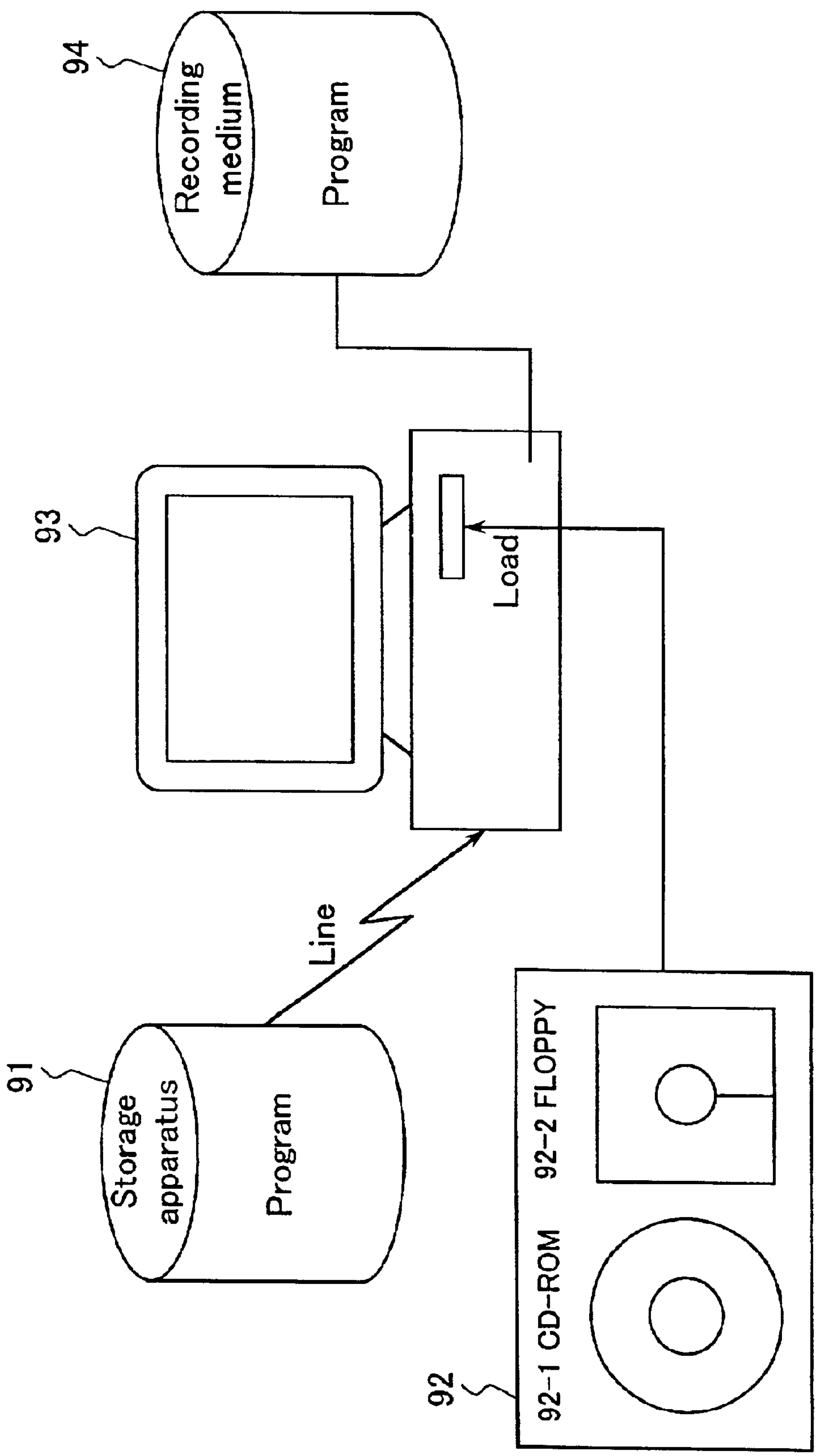
FIG. 9 illustrates a program use environment.

Furthermore, a recording medium storing a program for realizing the speech data compression/expansion apparatus of an embodiment according to the present invention may also be not only a portable recording medium 92 such as a CD-ROM 92-1 and a floppy disk 92-2, but also another storage apparatus 91 provided at the end of a communication line and a recording medium 94 such as a hard disk and a RAM of the computer 93, as shown in FIG. 9. During execution, a program is loaded and executed on a main memory.

Furthermore, a recording medium storing compressed data and the like generated by the speech data compression/expansion apparatus of an embodiment according to the present invention may also be not only a portable recording medium 92 such as a CD-ROM 92-1 and a floppy disk 92-2, but also another storage apparatus 91 provided at the end of a communication line and a recording medium 94 such as a hard disk and a RAM of the computer 93, as shown in FIG. 9. For example, such a recording medium is read by the computer 93 when the speech data compression/expansion apparatus of the present invention is used.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A speech data compression/expansion apparatus, comprising:

a waveform data reference/extraction part for extracting waveform data by referring to an existing waveform dictionary;

a use frequency information storage part for accumulating a use frequency used for speech synthesis regarding the extracted waveform data and storing it;

a use frequency-based compressed data generation/storage part for compressing the waveform data by changing a compression method gradually in accordance with the use frequency, storing the compressed waveform data in the waveform dictionary, and storing information on the compression method regarding each of the compressed waveform data; and a waveform data expansion part for expanding the compressed waveform data stored in the waveform dictionary, based on the information on the compression method, wherein one or a plurality of predetermined threshold value is determined with respect to the use frequency regarding the waveform data, and in a plurality of use frequency ranges partitioned with the threshold values, waveform data belonging to the use frequency range with a smaller use frequency is compressed by a compression method with a correspondingly increased compression ratio.

2. A speech data compression/expansion apparatus according to claim 1, wherein regarding the waveform data belonging to the use frequency range with a large use frequency, the waveform data expanded in the waveform data expansion part is stored in a temporary memory region, and speech synthesis is conducted using the expanded waveform data.

3. A speech data compression/expansion apparatus according to claim 2, wherein the use frequency is accumulated based on a purpose of use.

4. A speech data compression/expansion apparatus according to claim 2, wherein in a case where it becomes impossible to additionally store the newly expanded waveform data in the temporary memory region, the waveform data is deleted from the temporary memory region successively in an order from the waveform data with a smallest use frequency.

5. A speech data compression/expansion apparatus according to claim 4, wherein the use frequency is accumulated based on a purpose of use.

6. A speech data compression/expansion apparatus according to claim 1, wherein in a case where the waveform data expanded in the waveform data expansion part is stored in a temporary memory region irrespective of the use frequency, and it becomes impossible to additionally store the newly expanded waveform data in the temporary memory region, the waveform data is deleted from the temporary memory region successively in an order from the waveform data with a smallest use frequency.

7. A speech data compression/expansion apparatus according to claim 6, wherein the use frequency is accumulated based on a purpose of use.

8. A speech data compression/expansion apparatus according to claim 1, wherein the use frequency is accumulated based on a purpose of use.

9. A speech data expansion apparatus according to claim 1, wherein regarding the waveform data compressed by using the speech data compression/expansion apparatus of claim 1, the compressed waveform data stored in the waveform dictionary is expanded based on the information on the compression method.

10. A speech data expansion apparatus according to claim 9, wherein in a case where the waveform data expanded in the waveform data expansion part is stored in a temporary memory region irrespective of the use frequency, and it becomes impossible to additionally store the newly expanded waveform data in the temporary memory region, the waveform data is deleted from the temporary memory region successively in an order from the waveform data with a smallest use frequency.

11. A speech data expansion apparatus according to claim 9, wherein regarding the waveform data belonging to the use frequency range with a large use frequency, the waveform data expanded in the waveform data expansion part is stored in a temporary memory region, and speech synthesis is conducted by using the expanded waveform data.

12. A speech data expansion apparatus according to claim 11, wherein in a case where it becomes impossible to additionally store the newly expanded waveform data in the temporary memory region, the waveform data is deleted from the temporary memory region successively in an order from the waveform data with a smallest use frequency.

13. A speech data compression apparatus, comprising:

a waveform data reference/extraction part for extracting waveform data by referring to an existing waveform dictionary;

a use frequency information storage part for accumulating a use frequency used for speech synthesis regarding the extracted waveform data and storing it; and a use frequency-based compressed data generation/storage part for compressing the waveform data by changing a compression method gradually in accordance with the use frequency, storing the compressed waveform data in the waveform dictionary, and storing information on the compression method regarding each of the compressed waveform data, wherein a plurality of predetermined threshold values are determined with respect to the use frequency regarding the waveform data, and in a plurality of use frequency ranges partitioned with the threshold values, waveform data belonging to the use frequency range with a smaller use frequency is compressed by a compression method with a correspondingly increased compression ratio.

14. A speech data compression/expansion method, comprising:

extracting waveform data by referring to an existing waveform dictionary;

accumulating a use frequency used for speech synthesis regarding extracted waveform data and storing it;

compressing the waveform data by changing a compression method gradually in accordance with the use frequency, storing the compressed waveform data in the waveform dictionary, and storing information on the compression method regarding each of the compressed waveform data; and expanding the compressed waveform data stored in the waveform dictionary, based on the information on the compression method, wherein one or a plurality of predetermined threshold value is determined with respect to the use frequency regarding the waveform data, and in a plurality of use frequency ranges partitioned with the threshold values, waveform data belonging to the use frequency range with a smaller use frequency is compressed by a compression method with a correspondingly increased compression ratio.

15. A speech data expansion method, wherein regarding the waveform data compressed by the speech data compression/expansion method of claim 14, the compressed waveform data stored in the waveform dictionary is expanded based on the information on the compression method.

16. A speech data compression method, comprising:

extracting waveform data by referring to an existing waveform dictionary;

accumulating a use frequency used for speech synthesis regarding the extracted waveform data and storing it; and compressing the waveform data by changing a compression method gradually in accordance with the use frequency, storing the compressed waveform data in the waveform dictionary, and storing information on the compression method regarding each of the compressed waveform data;

wherein a plurality of predetermined threshold values are determined with respect to the use frequency regarding the waveform data, and in a plurality of use frequency ranges partitioned by the threshold values, waveform data belonging to the use frequency range with a smaller use frequency is compressed by a compression method with a correspondingly increased compression ratio.

17. A computer-readable recording medium storing a program to be executed by a computer for realizing a speech data compression/expansion method, the program comprising:

extracting waveform data by referring to an existing waveform dictionary;

accumulating a use frequency used for speech synthesis regarding the extracted waveform data and storing it;

compressing the waveform data by changing a compression method gradually in accordance with the use frequency, storing the compressed waveform data in the waveform dictionary, and storing information on the compression method regarding each of the compressed waveform data; and expanding the compressed waveform data stored in the waveform dictionary, based on the information on the compression method, wherein one or a plurality of predetermined threshold value is determined with respect to the use frequency regarding the waveform data, and in a plurality of use frequency ranges partitioned with the threshold values, waveform data belonging to the use frequency range with a smaller use frequency is compressed by a compression method with a correspondingly increased compression ratio.

18. A computer-readable recording medium storing a program to be executed by a computer for realizing a speech data expansion method, wherein regarding the waveform data compressed by using a program to be executed by a computer for realizing the speech data compression/expansion method of claim 17, the compressed waveform data stored in the waveform dictionary is expanded based on the information on the compression method.

19. A computer-readable recording medium storing a program to be executed by a computer for realizing a speech data compression method, the program comprising:

extracting waveform data by referring to an existing waveform dictionary;

accumulating a use frequency used for speech synthesis regarding the extracted waveform data and storing it; and compressing the waveform data by changing a compression method gradually in accordance with the use frequency, storing the compressed waveform data in the waveform dictionary, and storing information on the compression method regarding each of the compressed waveform data, wherein a plurality of predetermined threshold values are determined with respect to the use frequency regarding the waveform data, and in a plurality of use frequency ranges partitioned with the threshold values, waveform data belonging to the use frequency range with a smaller use frequency is compressed by a compression method with a correspondingly increased compression ratio.

* * * * *